Patented Apr. 24, 1945

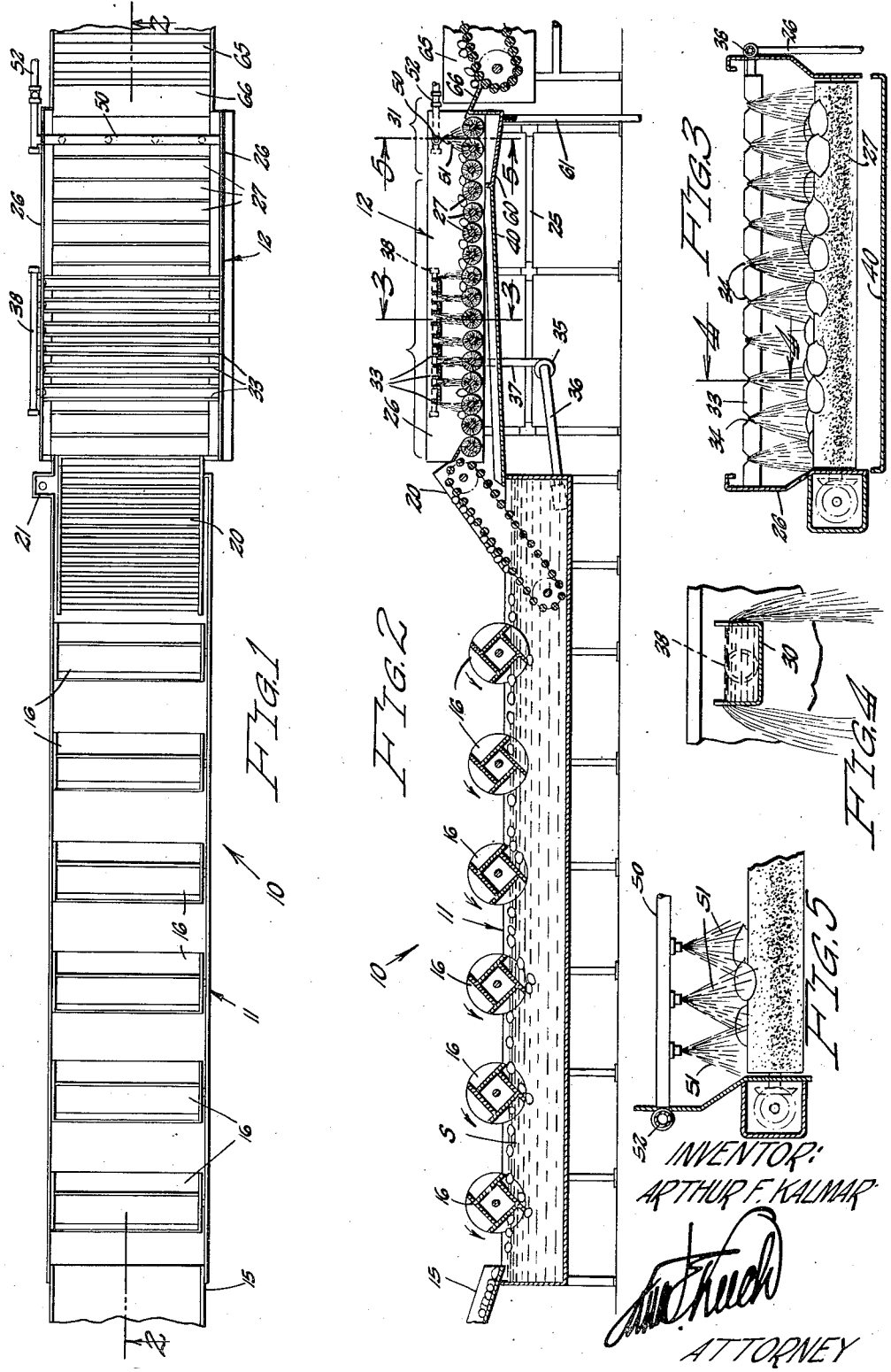

2,374,209

UNITED STATES PATENT OFFICE 2,374,209

PROCESS FOR TREATING FRUIT

Arthur F. Kalmar, Riverside, Calif., assignor to Food Machinery Corporation, San Jose, Calif., a corporation of California Application June 19, 1943, Serial No. 491,519

12 Claims. (Cl. 99—156)

This invention has to do with the treatment of fruit and vegetables to prepare these for shipment to market.

It is a broad object of this invention to provide an improved process for treating fresh whole fruit when preparing this for market, to prevent decay thereof caused by blue and green mold and other spoilage organisms during the considerable period of time which generally elapses between the harvesting of the fruit and its ultimate consumption.

The decay of fresh fruit and vegetables and particularly of citrus fruit, results mainly from infection taking place in the injuries received in the picking and handling of fruit incidental to its being harvested. To protect the fruit from decay, these injuries must first be disinfected, and then steps provided for preventing their re-inoculation.

As the cleaning of the fruit is essential in preparing it for market, and this requires considerable equipment, it is highly desirable to add no more to this equipment than is absolutely necessary in disinfecting and immunizing the fruit. The common method of cleaning citrus fruits as well as many other fruits and vegetables in preparing these for marketing, is to wash these in a solution of a detergent such as soap at a temperature of about 110° to 115° F. In this process the fruit is first soaked in the solution for varying periods, depending upon the tenacity with which the dirt or scale on the fruit surface adheres thereto, and then passed through a rotating brush washer while the cleaning solution is flooded over the fruit.

Many efforts have been made to combine the treatments for sterilizing and immunizing fruit with the cleaning treatment just outlined. This was not only to reduce equipment but to utilize the lowered surface tension in the detergent solution for enhancing the action of the fungicidal agent. Heretofore these efforts have had a limited degree of success, no practical way having been discovered for employing some of the most effective fungicides directly in the washing process.

One class of agents which, under closely controlled conditions, are highly effective as fungicides are water soluble salts of hydroxy diphenyl such as sodium or potassium orthophenylphenate. The salt of this class which is preferred for this purpose is sodium orthophenylphenate. (See U. S. Letters Patent 2,054,392 to J. N. Sharma.) This patent suggests the use of this agent for the disinfecting and immunizing of citrus fruits. This agent has a tendency to hydrolize when in a dilute solution, forming orthophenylphenol, a hydroxy diphenyl which is toxic to fruit and causes burning of the rind thereof. The Sharma patent suggests that a certain amount of free alkali such as sodium hydroxide be added to the solution of sodium orthophenylphenate to increase the pH and thereby prevent hydrolysis of this agent and the formation of orthophenylphenol. Considerable effort has been expended in attempts to apply commercially the Sharma teaching, but no practical treating method has been evolved from these efforts which would prevent frequent and excessive damaging of the fruit either by getting too much free alkali in the solution so that this itself damages the fruit or by having too little free alkali in the solution so as to permit the pH to drop below 10 whereby the sodium orthophenylphenate starts to become converted to its toxic form.

When sodium orthophenylphenate was used in accordance with the Sharma teaching in the detergent solution of the washing operation, the constant agitation and exposure of this solution to the atmosphere brought about the absorption of considerable amounts of $CO_2$ from the air which reacted with the free alkali in the solution to convert this into carbonate. This conversion of the free alkali lowered the pH value of the solution to where the sodium orthophenylphenate would be converted into orthophenylphenol. As a result, commercial operations for even one working day could not be carried on with assurance that the fruit would not suffer damage from the appearance of orthophenylphenol in the solution.

It is an object of my invention to provide a novel and practical method of treating fruit in which the fruit is washed, sterilized and immunized in a single operation, all three steps being accomplished in the same apparatus and at the same time and employing as the fungicidal agent a water soluble salt of hydroxy diphenyl.

It is a further object of my invention to provide a method of treating fruit as aforesaid which may be performed for a relatively long period between inspections of the alkalinity of the solution without danger of the fungicidal agent becoming converted into a toxic form in destructive quantities.

I have discovered that sodium orthophenylphenate may be employed for relatively long periods in the regular fruit washing detergent solution without the necessity for close inspection of the alkalinity of the solution and without danger of burning the fruit by introducing into this solution a buffer or regulator such as tetra sodium pyrophosphate. When .25% of this regulator is present in the solution hydrolysis of the orthophenylphenate is prevented. I prefer however to add about 1% by weight of regulator to the solution, after which I have found it practical to operate the triple purpose method of my own invention for as much as a week between alkalinity inspections without damage to the fruit. When thus performing my invention commercially I have found it to produce an exceptionally high degree of decay control.

Other buffers each of which is suitable for use as an alkalinity regulator in my process are .5% to .2% by weight of sodium carbonate and .5% to 1.25% by weight of trisodium phosphate.

To prevent hydrolysis of the orthophenylphenate, the pH should be kept above 10.2. Very little hydrolysis takes place however with the pH down to 10. It is preferable to use an excess of the buffer in the solution, as those named are not harmful in concentrations sufficient to raise the pH up to 11.5. Also, each of these buffers dissociates slowly so as to regulate the pH, keeping it above the stated minimum for a relatively long period if the buffer is present in excess.

In performing the process of my invention I prefer to employ a relatively long soaking tank containing the sterilizing, immunizing and detergent solution of the method, the fruit being conveyed from one end to the other of this tank through this solution and then being passed through a washer while a flood of this solution is poured over the fruit. The treating solution is thus caused to penetrate into all the cuts, punctures and other wounds in the surfaces of the fruit whereby the fungicidal agent is able to contact and destroy the decay-causing organisms present therein. This penetration takes place and is completed before the fruit passes out of the washer and I prefer to rinse the fruit at this point to remove the excess treating solution from the fruit before the latter passes on to the drier and is dried, or into a storage room as is the practice in handling lemons.

The spray here provided is insufficient to penetrate into the cuts and injuries of the fruit and does not disturb the orthophenylphenate deposited therein. The injuries in the fruit are thus immunized by the quantities of the sterilizing and immunizing agent remaining in these. Although the treating agent right at the mouth of some of these injuries may be washed therefrom by the rinse spray, the tendency is for a quantity of this agent inside these injuries to subsequently exude outwardly in the film of water present and thus immunize the entire injury from reinoculation.

A specific formula which I have found suitable for the triple-purpose solution of the process of my invention is as follows:

*Detergent, disinfecting and immunizing solution*

| | Per cent by weight |
|---|---|
| Detergent consisting of: | |
| Soap | .20 |
| Sodium carbonate | .50 |
| Sodium orthophenylphenate | 0.15 |
| Regulator for controlling pH value: tetrasodium pyrophosphate | 1.00 |
| Water | 98.15 |
| | 100.00 |

The manner of accomplishing the foregoing objects in performing the method of my invention hereinabove outlined, will be made clear in the following description taken in connection with the accompanying drawing, in which:

Fig. 1 is a plan view of an apparatus suitable for carrying out the triple purpose process of my invention commercially.

Fig. 2 is a longitudinal sectional view taken on the line 2—2 of Fig. 1.

Fig. 3 is an enlarged cross sectional view taken on the line 3—3 of Fig. 2.

Fig. 4 is an enlarged detail sectional view taken on the line 4—4 of Fig. 3.

Fig. 5 is an enlarged detail sectional view taken on the line 5—5 of Fig. 2.

Referring specifically to the drawing, I show diagrammatically therein an apparatus 10 which includes a solution tank 11 and a washer 12.

The solution tank 11 has a delivery board 15 for delivering fruit into a treating solution S contained therein and a series of rotary submergers 16 for submerging the fruit in said solution and assisting in the travel of fruit through the tank 11 from its receiving end to its discharge end. Extending into the discharge end of tank 11 is a discharge elevator 20 which delivers this fruit to the receiving end of the washer 12. The tank 11 is provided with a suitable overflow weir 21 for maintaining the solution S at a given level in this tank.

The washer 12 includes a frame 25 providing side walls 26 between which are mounted a series of transverse rotating cleaning brushes 27. The washer 12 may be considered as divided into a cleaning section 30 and a rinsing section 31. Disposed across the washer 12 above brushes 27 in the cleaning section 30 of the washer is a series of solution flooding troughs 33 having notches 34 along their sides through which solution is adapted to be poured from these troughs onto fruit resting on the brushes 27 in this section.

A power-operated pump 35 withdraws solution S from the tank 11 through a pipe 36 and delivers this through a pipe 37 to a manifold pipe 38 which delivers this solution to the respective troughs 33 aforesaid. The solution thus flooded over fruit on the brushes 27 in the section 30, upon dripping downwardly therefrom, is caught by a drip pan 40 which returns this solution to the tank 11.

Extending across the rinsing section 31 of the washer 12 is a rinse spray pipe 50 from which a series of clear water sprays 51 are discharged downwardly. This water is supplied to the pipe 50 from the domestic water system through a valved pipe 52. Disposed beneath the brushes 27 in the rinse section 31 is a drain pan 60 from which used rinse water is conducted to the sewer by a pipe 61.

After the fruit is treated in the apparatus 10 it may be delivered from the discharge end of the washer 12 to any suitable piece of apparatus such as a conveyor 65 which may lead to a drier or to a sorting table, this depending upon what kind of fruit is being treated. The fruit travels from the washer 12 to the conveyor 65 over a delivery board 66.

In performing the process of my invention commercially in the apparatus 10, suitable power means (not shown) is provided for rotating the rotary submergers 16 and the washer brushes 27 and operating the elevator 20, the conveyor 65 and the pump 35. The fruit is then fed over the delivery board 15 into the solution S which is the triple-purpose cleaning, disinfecting and immunizing solution of my invention.

The tank 11 is of such a length and the apparatus is preferably operated at such a speed that the fruit delivered to the tank over the board 15 remains in the solution S from two to four minutes before it is removed from the solution by the elevator 20. This fruit is then delivered into the washer 12 and progresses across the tranversely disposed rotating brushes 27 under the flood of solution S delivered downwardly onto this fruit as indicated in Fig. 2.

This alternate soaking of the fruit in the solution S in the tank 11 and then scrubbing of the fruit in the presence of the solution in the washer 12 not only completely cleanses the outer surface of the rind but works the solution S with the powerful fungicidal agent contained therein into the cuts and injuries present in the rind surface. Thus when the fruit passes through the fresh water sprays 51 at the discharge end of the washer 12, only that portion of the treating solution which is on the uninjured outer water-repellent surfaces of the fruit is removed by this spray and the portions of this solution which have penetrated into the rind injuries remain in these injuries to immunize them against reinoculation.

From the foregoing description it is clear that the process of my invention cleans, sterilizes and immunizes fruit without danger of damaging the fruit. It does this by contacting the fruit with one of the most effective fungicidal agents known, the use of which for this purpose has hitherto been very limited because of inability to use it consistently without damage to the fruit. My process, however, has solved this problem by controlling the pH of the solution, to prevent hydrolysis of the agent, with a buffer supplied in substantial excess of the minimum needed. Moreover the buffers employed are themselves non-toxic to the fruit when thus present in excess.

What I claim is:

1. A method of treating fresh whole fruit for cleaning and disinfecting said fruit and immunizing the same against decay, which comprises, contacting the fruit with an aqueous solution containing a detergent, a water soluble salt of hydroxy diphenyl, and tetra sodium pyrophosphate in sufficient concentration to maintain the pH above 10.

2. A method of treating fresh whole fruit for cleaning and disinfecting said fruit and immunizing the same against decay, which comprises, contacting the fruit with an aqueous solution containing a detergent, sodium orthophenylphenate and tetra sodium pyrophosphate in sufficient concentration to maintain the pH above 10.

3. A method of cleaning and sterilizing fresh whole fruit and immunizing the same from decay, which comprises, contacting said fruit for a period of approximately four minutes with an aqueous solution containing a detergent, a water soluble salt of hydroxy diphenyl, and tetra sodium pyrophosphate in sufficient concentration to maintain the pH above 10.

4. A method of cleaning and sterilizing fresh whole fruit and immunizing the same from decay which comprises, scrubbing said fruit in the presence of an aqueous solution containing a detergent, a water soluble salt of hydroxy diphenyl and tetra sodium pyrophosphate, in sufficient concentration to maintain the pH above 10, to cause said solution to penetrate into injuries in the rind of said fruit, and rinsing said solution from the water-repellent uninjured rind surfaces of the fruit.

5. A method of treating fresh whole fruit for disinfecting said fruit and immunizing the same against decay, which comprises, contacting the fruit with an aqueous solution containing a water soluble salt of hydroxy diphenyl, and tetra sodium pyrophosphate in sufficient concentration to maintain the pH above 10.

6. A method of treating fresh whole fruit for disinfecting said fruit and immunizing the same against decay which comprises, contacting the fruit with an aqueous solution containing sodium orthophenylphenate and tetra sodium pyrophosphate in sufficient concentration to maintain the pH above 10.

7. A method of treating fresh whole fruit for disinfecting said fruit and immunizing the same against decay which comprises, contacting the fruit with an aqueous solution containing sodium orthophenylphenate and a buffer salt selected from the group consisting of: tetra sodium pyrophosphate, sodium carbonate and tri-sodium phosphate in sufficient concentration to maintain the pH above 10.

8. A method of treating fresh whole fruit for protecting the same against decay which comprises, contacting the fruit with an aqueous solution containing a water soluble salt of hydroxy diphenyl, and a buffer salt selected from the group consisting of: tetra sodium pyrophosphate, sodium carbonate and tri-sodium phosphate in sufficient concentration to maintain the pH above 10.

9. A method of treating fresh whole fruit for protecting the same against decay which comprises, contacting the fruit with an aqueous solution containing a water soluble salt of hydroxy diphenyl, and a buffer salt selected from the group consisting of: tetra sodium pyrophosphate, sodium carbonate and tri-sodium phosphate in sufficient concentration to maintain the pH above 10, scrubbing said fruit in the presence of said solution, and rinsing from said fruit the portion of said solution adhering to the water-repellent uninjured rind surfaces of the fruit.

10. A method of treating fresh whole fruit for cleaning and disinfecting said fruit and immunizing the same against decay, which comprises, contacting the fruit with an aqueous solution containing a detergent, a water soluble salt of hydroxy diphenyl, and sodium carbonate in sufficient concentration to maintain the pH above 10.

11. A method of treating fresh whole fruit for cleaning and disinfecting said fruit and immunizing the same against decay, which comprises, contacting the fruit with an aqueous solution containing a detergent, a water soluble salt of hydroxy diphenyl, and tri-sodium phosphate in sufficient concentration to maintain the pH above 10.

12. A method of treating fresh whole fruit for protecting the same against decay which comprises, contacting the fruit with an aqueous solution containing a detergent, a water soluble salt of hydroxy diphenyl, and a buffer salt selected from the group consisting of: tetra sodium pyrophosphate, sodium carbonate and tri-sodium phosphate in sufficient concentration to maintain the pH above 10, scrubbing said fruit in the presence of said solution, and rinsing from said fruit the portion of said solution adhering to the water-repellent uninjured rind surfaces of the fruit.

ARTHUR F. KALMAR.

CERTIFICATE OF CORRECTION.

Patent No. 2,374,209.　　　　　　　　　　　　　　　　April 24, 1945.

ARTHUR F. KALMAR.

It is hereby certified that error appears in the printed specification of the above numbered patent requiring correction as follows: Page 2, first column, line 15, for ".2%" read --2.%--; and that the said Letters Patent should be read with this correction therein that the same may conform to the record of the case in the Patent Office.

Signed and sealed this 18th day of September, A. D. 1945.

Leslie Frazer (Seal)　　　　　　　　First Assistant Commissioner of Patents.